(12) United States Patent  (10) Patent No.: US 6,302,633 B1
Poe  (45) Date of Patent: Oct. 16, 2001

(54) MULTIPLE PITCH THREADED FASTENER APPARATUS

(76) Inventor: L. Richard Poe, 73-097 Monterra Cir. North, Palm Desert, CA (US) 92260-6619

( * ) Notice: Subject to any disclaimer, the term of this patent is extended or adjusted under 35 U.S.C. 154(b) by 0 days.

(21) Appl. No.: 09/465,950

(22) Filed: Dec. 17, 1999

(51) Int. Cl.[7] ........................................ F16B 37/08
(52) U.S. Cl. .......................... 411/432; 411/318; 411/551
(58) Field of Search .................................. 411/432, 433, 411/216, 217, 315–318, 383, 384, 551, 178

(56) References Cited

U.S. PATENT DOCUMENTS

| | | | |
|---|---|---|---|
| 2,879,574 | * | 3/1959 | Zahodiakin . |
| 2,922,211 | * | 1/1960 | Boyd . |
| 4,042,239 | * | 8/1977 | DeFusco . |
| 5,624,221 | | 4/1997 | Poe . |
| 5,700,122 | * | 12/1997 | Korpi . |
| 5,716,180 | * | 2/1998 | Bowers . |

* cited by examiner

Primary Examiner—Flemming Saether
(74) Attorney, Agent, or Firm—Fulwider Patton Lee & Utecht LLP (57) ABSTRACT

A fastener apparatus having a bolt member with a fast lead threaded portion, a barrel member with a fine lead threaded portion, a collar member interposed between the bolt and the barrel and including both fast lead and fine lead threads to mesh with the respective threads on the bolt and the barrel, and an actuator for coupling two of the three members together so that in one instance the fastener is drawn rapidly on fast lead threads through a significant distance and in the second instance the fastener is drawn together on fine lead threads providing additional mechanical advantage.

42 Claims, 7 Drawing Sheets

MULTIPLE PITCH THREADED FASTENER APPARATUS

BACKGROUND OF THE INVENTION

1. Field of the Invention

The invention relates generally to fasteners and more specifically, to fasteners having multiple mechanical advantages and capable of carrying relatively large loads.

2. Description of the Prior Art

Many thread forms varying in shape, pitch, and thread direction have been developed to provide finer adjustment with greater mechanical advantage or, conversely, fast lead screw designs having less mechanical advantage but providing the benefit of traveling farther with fewer turns. The disadvantage of all these present designs, when used on an externally threaded bolt turned into an internally threaded receptacle such as a nut, is the fact that both external and internal threads must be of the same size, shape, and pitch. Additionally, much of the time spent threading a bolt is spent threading under little or no load with a thread pitch having a greater mechanical advantage selected for the final end load. This wastes both time and energy. One response is to increase the pitch for a greater rate of travel. However, an additional drawback occurs when increasing pitch for a common bolt to obtain faster operation because the faster lead threads readily unthread under tension.

Fasteners for rapid fastening and release operations have been in use for a considerable period of time, especially in the aerospace industry. It is desirable that such fasteners be operable without special tools.

One particular fastener in general use today for quick take-up is the quarter turn fastener which is widely used to replace common screws and bolts. Such quarter turn fasteners suffer the drawback that they are typically quite limited in their reach or stroke. At the present time, use of threaded fasteners or elaborate latching mechanisms is limited to those applications where the components to be drawn together are spaced apart a distance of a couple of inches or less. Large "V" bands currently used for securing cowlings or other components in the housings of aircraft engines together require tightening through several inches into a preload condition of thousands of pounds and typically require high speed take-up.

In recognition of the need for a multiple speed take up fastener, a number of solutions have been proposed. One such device is described in U.S. Pat. No. 5,624,221 to the present inventor. This fastener includes a first and second pair of interengageable threaded members having different pitches and opposing thread directions. The first pair includes a first actuator with external fine lead threads for engaging the interior threads of a first thread plate. The second pair includes a second actuator which has coarse external threads engaged with the internal threads of a second threaded plate. A coupling assembly including a drive member, a driver member, an elongated rod, and a compression spring is provided to couple the first actuator with the second actuator. A bolt projects through and connects both pairs of interengageable members. Rotation of the bolt turns the fine thread of the first actuator and moves the first plate toward the second plate while at the same time turning the second actuator and second plate on opposite threads toward the first plate thereby drawing the attached structure together. As the two pairs approach, the spring disengages the drive member from the first actuator so that no further rotation of the second actuator will occur. From this point, only rotation of the first actuator is continued to draw the structures together on fine lead threads. While this device has proven satisfactory, the ability to perform a similar function with less moving parts in a smaller compact assembly still remains.

What is needed is a relatively simple bolt and receptacle assembly that combines the advantages of fast lead threads with fine lead threads with both threads running in the same direction and having a locking feature that resists the unthreading of the fast lead threads from vibrational and other load forces.

SUMMARY OF THE INVENTION

One embodiment of the present invention includes a multiple pitch threaded fastener engaged with a two speed collar member interposed between a bolt member having external fast lead threads and a barrel member having interior fine lead threads. An actuator includes a keeper constructed to shift, upon engagement by an actuating shoulder on a follower, from a latched position with the collar member coupled to the barrel member with the bolt free to rotate relative to the collar, to an unlatched position, with the collar coupled to the bolt and free to rotate on fine lead threads relative to the barrel.

The actuator may be pivotally mounted on the collar to be biased radially outwardly into a latched position.

An alternative feature of the present invention is an actuator including a wave washer and a pair of diametrically opposed spring arms terminating in a pair of retractable keepers.

Another embodiment of the present invention includes a pin stop to inhibit rotation of the collar upon unthreading.

Yet another feature of the present invention is a cap including a ramp for driving the keeper from a unlatched position to a latched position.

Numerous advantages and aspects of the invention will be apparent to those skilled in the art upon consideration of the following detailed description taken in conjunction with the drawings which generally provide illustrations of the invention in its presently preferred embodiments.

DETAILED DESCRIPTION OF THE PREFERRED EMBODIMENT

Figure 1:
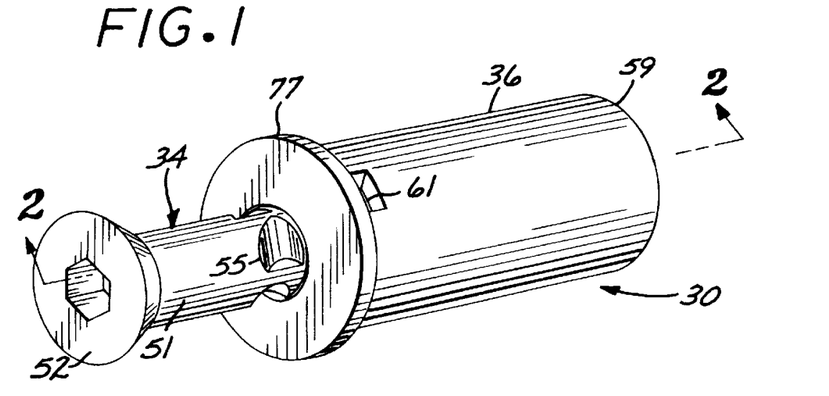
FIG. 1 is a perspective view of a multiple pitch threaded fastener apparatus embodying the present invention.
Figure 2:
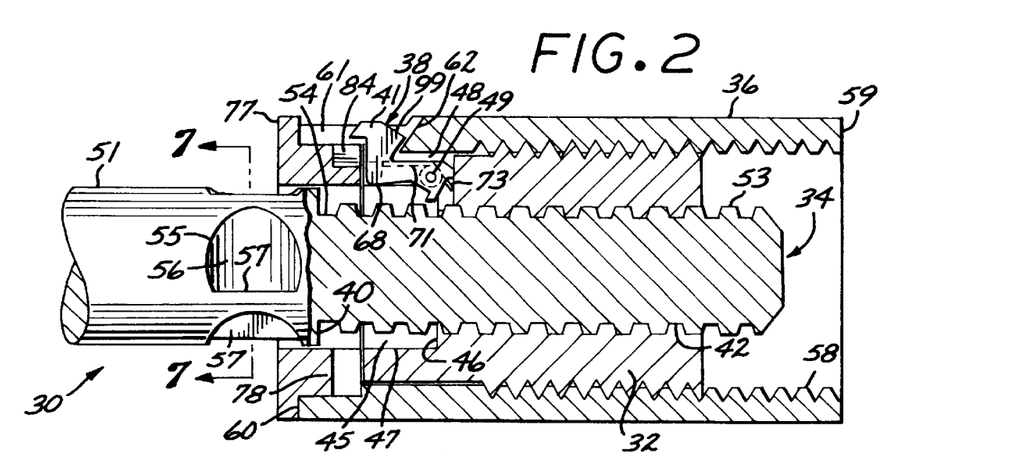
FIG. 2 is a sectional view, in enlarged scale, taken along the line 2—2 of FIG. 1.
Figure 3:
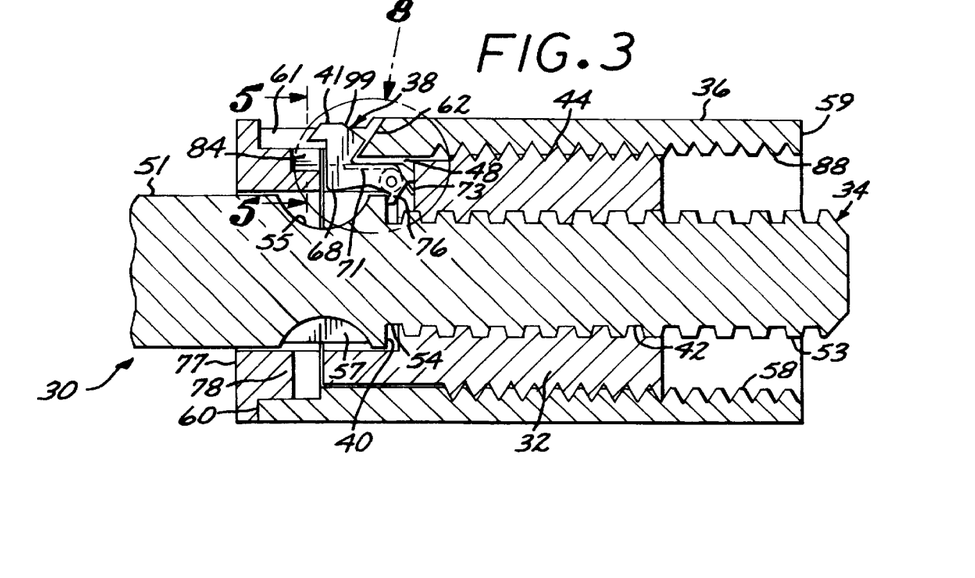
FIG. 3 is a similar view to that shown in FIG. 2 illustrating the initial contact between the bolt and actuator.

Referring now to FIGS. 1–3, the fastener apparatus of the present invention, generally designated 30, includes an internally and externally threaded collar 32 carried in an internally threaded barrel housing 36 to drivingly engage a threaded male bolt 34. An actuator, generally designated 38, is interposed between the barrel and bolt members to be triggered by an actuating shoulder 40 to shift an actuator keeper 41 between a latched position with the collar member inhibited from rotating within the barrel to an unlatched position freeing such collar to be rotated relative to the barrel.

Figure 9:
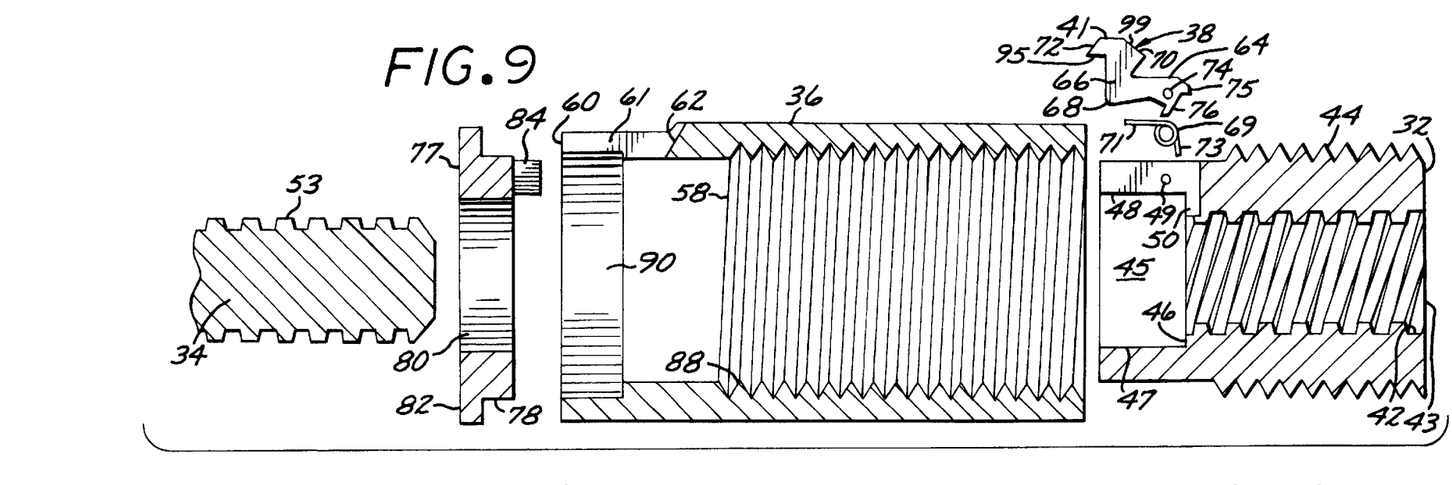
FIG. 9 is an exploded view, in enlarged scale, of the embodiment depicted in FIG. 1.

Referring now to FIGS. 2, 3 and 9, the shifting collar 32 also referred to as a thread selector is generally a cylindrically shaped transfer or shift member and is formed with coarse lead internal threads 42 projecting into a central through bore 43 and further formed with finer lead external threads 44. The central through bore 43 and the internal threads define an internal threaded longitudinal passageway throughout the collar or thread transfer member 32. The bolt member 34 with its matching externally formed coarse or fast lead threads 53 may be screwed throughout this passageway to travel longitudinally at a rapid first rate through the collar member in a minimal number of turns or rotations. In contrast, the external threads of the collar 32 have a relatively small or fine pitch providing a significant mechanical advantage as more load is placed upon the fastener and the components to be fastened are drawn closer together.

With continued reference to FIG. 9, the distal end of the collar member 32 is open ended to accommodate passage of the distal end of the bolt 34 through the collar. The proximal end of the collar member is formed with an unthreaded counterbore 45 constructed to receive an enlarged portion of the bolt. The counterbore includes at its distal edge a loft facing seat 46 projecting radially outwardly from one terminus of the internal thread section. From the outer diameter of the seat the compartment projects axially to the left to form a sleeve section 47. Such collar is further formed at its left end extremity along one side with an axially projecting actuator transfer notch 48 opening to the left, as viewed in FIGS. 2, 3, 8 and 9. According to FIGS. 8 and 9, the right hand end of the transfer slot 48 receives a torsion spring 69 mounted about a transversely projecting cylindrical pivot pin 49 which is captured by its opposite ends in bores located in the opposing sidewalls of such transfer slot. Such spring is formed with a first leg 71 (FIG. 8) abutting the blind end 93 of the notch 45 and the opposite second leg 73 projecting beneath and abutting the radial underside 91 of the lever arm 66 of the actuator to bias such actuator counterclockwise about the captured pivot pin, as viewed in FIGS. 8 and 8A, thus urging the keeper 41 radially outwardly. The rightmost extremity of such actuating notch or transfer slot is undercut by a recess notch 50 which provides room for rotation of a trip leg 76 of the actuator 38 (FIG. 8) as will be explained in further detail below.

Figure 7:
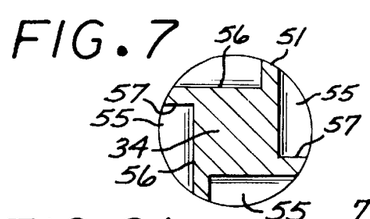
FIG. 7 is a sectional view taken along the line 7—7 of FIG. 2.

Turning now to FIGS. 1–3 and 9, the bolt 34 is formed with an elongated shank 51 projecting from a bolt head 52 which includes an axially projecting Allen head socket formed therein. As viewed in FIG. 2, the bolt is stepped down at an intermediate point along its shank to form a annular actuating shoulder 40 facing to the right and which is spaced apart by a small gap 54 from the coarse threads 53 formed in the reduced-in-diameter section with a pitch equal to the pitch of the internal threads 42 of the collar member 32. Typical pitch ranges of the fast lead threads to fulfill a variety of applications are about one-sixth to one-third of an inch and are constructed with quad leads. The enlarged section of the elongated shank includes nesting recesses or clearance notches 55 formed therein by means of respective semi-elliptically shaped, axially projecting bowls 56 formed along one side thereof and a sidewall 57 projecting radially from the straight edge of the bowl (FIGS. 1, 2 and 7). The respective recesses 55 are spaced equidistantly about the shank 51 as shown in FIGS. 1 and 7 and are positioned to be individually selectively aligned at a location radially inwardly from the actuator 38 to receive the inwardly rotated keeper as described hereinafter. The depth of notch provides nesting space for the keeper 41 in the unlatched position. Assuming right hand threads, counterclockwise rotation of the fully seated bolt causes such lip within the radially aligned recess to abut one edge of the keeper 41 of the actuator 38 which is anchored within the transfer slot 48 of the collar member 32. Subsequent rotation of the bolt will thereby rotate the coupled collar member as will be described in more detail below.

The barrel 36, which may provide a convenient surface for mounting to one of the components to be fastened, generally includes a shell formed with a cylindrically shaped interior passage circumscribed by a fine lead thread 58 which is dimensioned to surround the collar 32 and mesh with the fine lead external collar threads 44. The distal end 59 of the barrel is open ended but may be closed if sufficient space is provided for the longitudinal travel of the bolt 34. The left hand end 60 of such barrel 36 is formed with a counterbore 90 for receipt of a portion of a cap 77 or mounting plate. Such proximal end 60 defines an opening for initial insertion of the bolt into the collar-barrel subassembly and is farther formed at its left end extremity with an axially projecting Open ended keeper slot 61 configured at its blind end with an upwardly and inwardly angled hook surface 62 oriented at an angle to complement the angle of the hook surface formed on the keeper hook 70. The exterior surface of the barrel is illustrated as cylindrical in FIG. 1 but may generally take any suitable shape for incorporation into a variety of structures.

Figure 5:
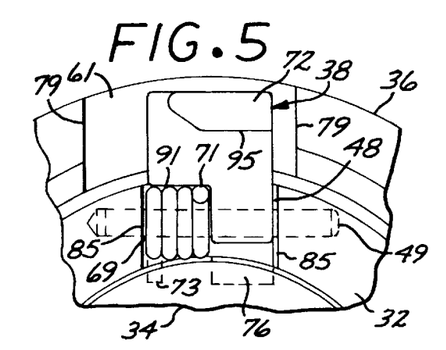
FIG. 5 is a sectional view, in enlarged scale, taken along the line 5—5 of FIG. 3.
Figure 8:
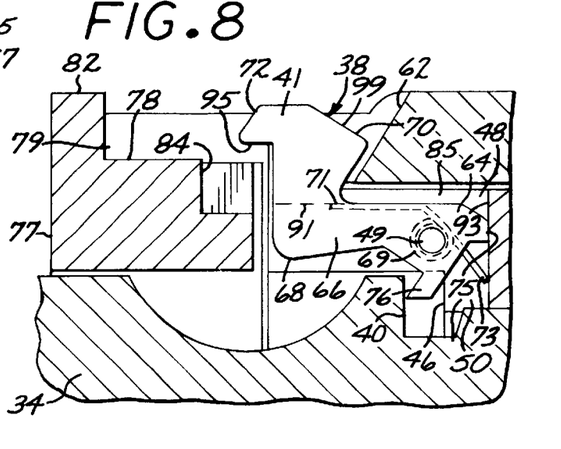
FIG. 8 is a detailed side view, in enlarged scale, taken from the oval 8 in FIG. 3.

Shifting between an unlatched position and a latched position enables both the rapid deployment ability of the fast lead threads and the greater mechanical advantage of the fine lead threads of the fastener apparatus 30 to be used. Referring to FIG. 8, this shifting function is provided by the actuator 38 which consists of a keeper 41 and a follower 64 separated by a longitudinally projecting neck 66. The right end of the longitudinally projecting neck 66 includes a pin receiving opening 74 for capture of a laterally projecting pivot pin 49 carried on its opposite extremities in the sides of the transfer slot 48 (FIG. 5). Thus, the actuator is pivotally mounted to the collar member within the transfer slot. At the opposing end of the longitudinally projecting neck, the actuator bends radially outwardly forming an elbow 68 to terminating at its radial extent in a keeper 41. The keeper 41 is formed, as viewed in FIG. 8, with a somewhat triangularly shaped hook 70 projecting to the right, as viewed in FIG. 8, and is formed at its radially outwardly disposed free extremity with a ramp flange 72 which projects to the left and is formed with an actuating surface 95 facing radially inwardly as viewed in FIGS. 6 and 14–15.

Figure 8A:
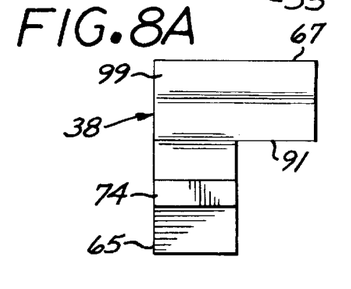
FIG. 8A is a detailed right end view, in enlarged scale, of the actuator.

The follower 64 is formed with a spacer 75 and a trip leg 76. As viewed in FIG. 8, the spacer projects longitudinally from the right end of the lever arm 66 and assists in aligning the actuator within the transfer slot 48 during assembly. The right end wall 93, as viewed in FIG. 8, of the spring leg recess 50 provides a stop to the second arm 73 of the torsion spring 69 inhibiting rotation of the torsion spring in one direction. The first arm 71 of the torsion spring rests against the radially inner side 91 of the lever arm to cooperate with the second arm in biasing the keeper into a radially outward position or latching position (FIGS. 8 and 8A). The trip leg 76 projects radially inwardly and axially forwardly from the right end of the lever arm 66. Such trip leg must project radially inwardly a sufficient distance to engage the bolt shoulder 40 as it travels longitudinally through the collar 32.

As shown in the FIGS. 8 and 8A, the actuator 38, when viewed in an axial plane, includes a mounting flange 65 or lug projecting downwardly on one side of a cross member 67. The spacing of the mounting flange provides room for a torsion spring 69 mounted on pin 49 journaled through a pin receiving bore 74 and having a first arm 73 abutted against the front end of the collar 32 and a second arm 71 biased radially outwardly against the radial underside 91 such cross member of such actuator to bias it clockwise as shown in FIG. 8.

Figure 6:
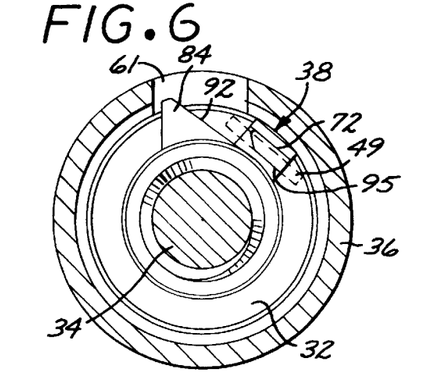
FIG. 6 is a sectional view taken along the line 6—6 of FIG. 4.

Referring to FIGS. 6 and 9, an optional annular cap 77 is formed with a cylindrical boss 78 and an enlarged diameter collar 82 to be telescopically received into the counterbore 90 of the barrel 36 and overlie the end thereof. Such cap is formed with the clearance bore 80 for receipt of the enlarged bolt shank 51 into the barrel 36 and collar 32. Such boss 78 is further formed with an axial, radially outwardly projecting cam 84 configured with a triangularly shaped angular cam surface 92 angling radially and laterally inwardly along the tangent to such boss, as viewed in FIG. 6. Although not critical to the operation of the fastener, such cam may be incorporated to assist the torsion spring 69 in driving the keeper 41 into a radially outward position of the keeper 41 by acting as a wedge on the actuating surface 9; of the ramp flange 72 (FIG. 6).

Figures 14, 15:
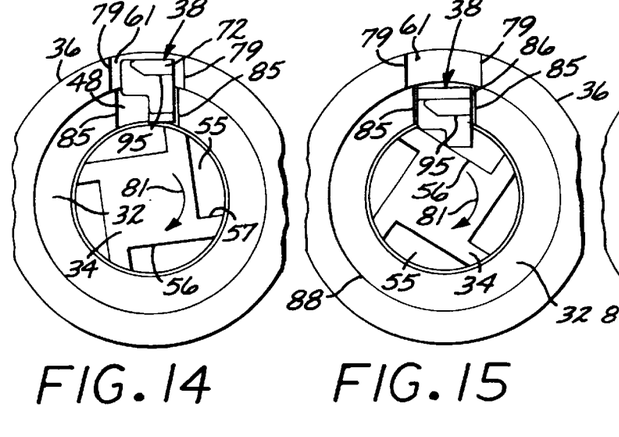
FIG. 14 is a partial axial sectional view, in enlarged scale, depicting the actuator of the first embodiment in a latched position.
FIG. 15 is a partial axial view similar to FIG. 14 depicting the actuator position in an unlatched position during threading of the bolt.

Referring now to FIGS. 2 and 9, the assembly and use of the fastener apparatus 30 components will now be described. The torsion spring 69 is placed adjacent the mounting flange 65 of the actuator 38 and positioned with the first arm 71 beneath the lever arm 66 of the actuator (FIG. 5). The anchor pin is received through the pin opening 74 and spring and this spring-actuator subassembly is placed within the transfer slot 48 of the collar. The ends of the pin may be slid into pin receiving bores on either sidewall of such transfer slot or retained in any well known manner such that the pin is captured within the transfer slot. The collar and actuator subassembly is then inserted into the proximal end of the barrel 36 and the external fine lead threads 44 of the collar 32 are threaded into the fine lead threads 58 of the barrel 36 until the triangular hook 70 is flush with the hook surface 62 of the barrel (FIGS. 2 and 8). Alternatively, the keeper 41 may be manually pushed inward and the actuator collar subassembly may be threaded through the distal open end of the barrel until the keeper pops outwardly into the keeper slot 61. The cap 77, if being used, is slid into the left end of the barrel as viewed in FIGS. 2 and 3. It will be appreciated that the cap could be threaded into complementary threading incorporated into the proximal end of the barrel if desired. Other means for securing the cap would be within the skill of one of ordinary skill in the art. At this point, it will be appreciated that the outwardly disposed keeper 41 creates a positive lock between the collar 32 and the barrel 36 preventing relative rotation therebetween due to the interference between the axially projecting sidewalls 79 of the keeper slot 61 and the keeper (FIG. 14).

To fasten two components together, the barrel 36 may be mounted on a first component of the structure to be connected to a second component by means of the bolt 34. In order to introduce the bolt 34 into the receiver subassembly which includes the collar 32, barrel 36, actuator 38, and cap 77, the distal end of the bolt is inserted through the clearance opening 80 in the cap. As the bolt travels longitudinally through the sleeve 47 of the collar, it will eventually encounter the leading edge of the fast lead threads 42 in the collar bore 43. At this point and assuming right hand threads, the bolt may rotated in a clockwise direction at a first rate of speed on the matching fast lead threads 53 and 42 (FIGS. 2 and 9) as indicated by the arrow 81 in FIGS. 14–15. It will be appreciated that the fast leads thread enable the bolt to travel a significant longitudinal distance with only a few turns of the bolt. The collar will resist rotation due to the positive lock provided by the outwardly disposed keeper 41.

The initial placement of such keeper 41 is in the latched position in the keeper slot 61 to be attached to the lever arm 66 which is anchored by the mounting pin 49 to the collar 32 so the collar is prevented from rotating relative to the barrel. In other words, the collar is effectively coupled to the barrel by the actuator at this point because the sidewalls 79 of the slot 61 interfere with the rotation of the which is anchored to the collar (FIG. 14). The keeper does not interfere with the travel of the bolt at this point as the radially innermost extent of the elbow 68 is radially exterior to the shank of the bolt (FIG. 2 and 14).

The bolt 34 may be rotated to be advanced and cause the actuating shoulder 40 to engage the trip leg 76 of the actuator (FIG. 3). Upon further turning of the bolt to cause additional longitudinal travel of such shoulder, such trip leg will be driven longitudinally to the right as viewed in FIG.

Figure 4:
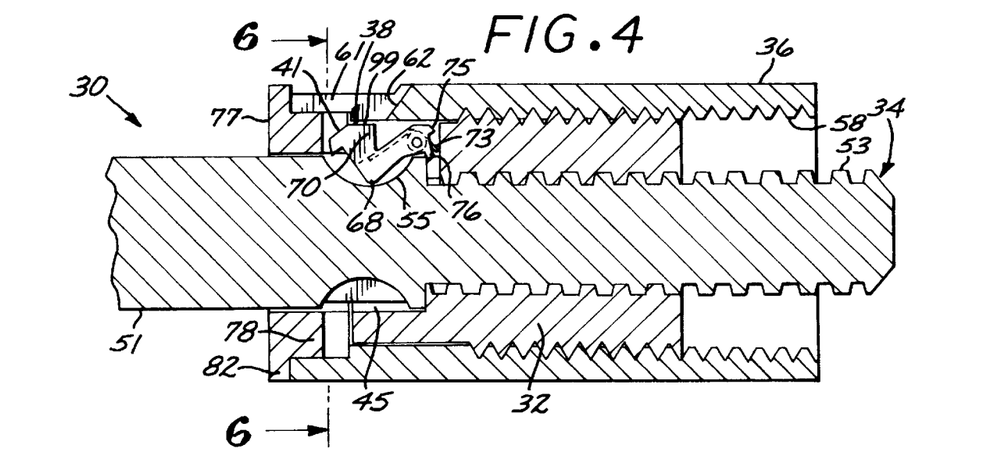
FIG. 4 is a similar view to that shown in FIG. 3 with the actuator engaged and rotated into an unlatched position.
Figure 16:
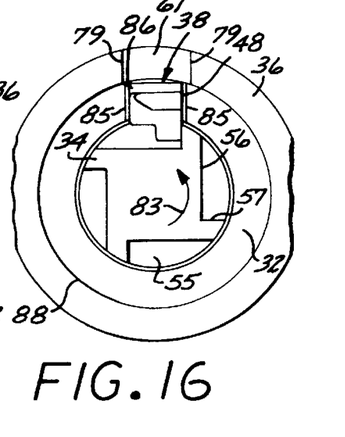
FIG. 16 is a partial axial view similar to FIG. 15 illustrating the actuator position in an unlatched position during unthreading of the bolt.

3 causing the keeper 41 to rotate counterclockwise to the unlatched position shown in FIG. 4. FIGS. 15–16 illustrate this same position when viewed in an axial plane. In the fully unlatched position, the elbow 68 of the actuator is generally adjacent or even abutting the bowl 56 of the clearance notch. The fully unlatched position occurs as the shoulder 40 fully abuts the seat 46 of the collar. The keeper hook 70 is positioned radially interiorly of the beveled edge 62 to clear the sides of the keeper slot 61 thus releasing the positive lock between the collar and barrel so that the collar may be rotated relative to the barrel (FIGS. 4 and 15–16). The seating of the bolt shoulder 40 against the seat 46 of the collar causes clockwise rotational forces acting on the bolt to be transmitted to the collar such that continued clockwise rotation of the bolt 34 concurrently turns the collar in the clockwise threading direction as indicated by the arrow 81 in FIG. 15. As this rotation occurs, the bolt is effectively coupled to the collar but the collar and bolt coupling are free to rotate relative to the barrel along a screw path defined by the meshing fine threads of the collar and barrel. It will be appreciated that greater mechanical advantage is achieved due to the finer pitch threads over which movement is taking place at this point. The fastener apparatus 30 may be further tightened as desired through additional rotations of the bolt in the same direction.

Referring now to FIGS. 4, 8 and 15–16, during rotation of the collar 32 relative to the barrel 36, when the keeper 41 is nested in one of the clearance notches 55, the leading edge 86 on the radially outwardly facing wall 99 of the keeper will engage the inside diameter 88 of the fine lead threads 58 of the barrel 36 as the collar orbits within the barrel (FIGS. 15–16). When the bolt is rotated in a clockwise direction as indicated by the arrow 81 in FIG. 15, the leading edge 86 is located on the right radial outer corner of the keeper. When the bolt is rotated in a counterclockwise direction indicated by the arrow 83 in FIG. 16 for unthreading right hand threads, such leading edge is located on the opposing left radial outermost corner of the keeper. As the keeper is rotated relative to the barrel, such leading edge slides along the inner diameter 88 of the inner threads 58 encountering frictional resistance of a magnitude dictated by the force created by the torsion spring 69 biasing such keeper radially outwardly against such internal threads.

I have found that I can take advantage of this frictional design feature by varying the degree of contact between the leading edge 86 and the minor diameter 88 of the inner threads 58. For instance, such leading edge may be finished, rounded, or beveled to reduce friction between the keeper and the fine lead threads of the barrel in either direction. By varying the level of finishing, a select magnitude of frictional resistance maybe developed and thus the desired amount of release torque designed into the fastener. Alternatively, the leading edge may be squared to provide additional friction between the keeper and the fine lead threads of the barrel. This is especially useful during unthreading to provide a frictional locking feature that inhibits unthreading of the bolt from the assembly. It is preferable to use a finished leading edge in the threading direction and incorporate a rougher leading edge on the unthreading side of the keeper to facilitate both smooth threading and inhibition against unthreading. As an alternative to or in conjunction with, the fine lead threads of the barrel maybe scored longitudinally to increase the frictional interference with the leading edge of the keeper. Another means of increasing the frictional forces between the keeper and the fine lead threads of the barrel would be to increasing the spring force of the torsion spring 49 that outwardly biases the keeper 41.

Referring now to FIGS. 7, 15, and 16, the space between the bowl stop 56 and the sidewall 57 in conjunction with the size of the keeper 41, may allow some reverse rotation of the bolt 34 when fully tightened. This may be undesirable for components under a significant amount of tension. To overcome this backlash effect, the frictional resistance of the fast lead thread to tension loading, at or near the desired preload, must be greater than that for the fine lead thread, and after an initial torque motion fully tightens the bolt, a second torque is applied to the bolt. The fine lead thread will turn first because of lesser frictional resistance than the fast lead threads to recover the slight loss of bolt tension due to backlash and thread into the fully locked position on the fine threads. Further backlash is prevented by contact between the elbow 68 of the keeper 41 with sidewall 57 of bolt recess 55, remaining in place.

In order to unthread the fastener apparatus 30 from a position shown in FIGS. 4 and 16 with the keeper in the unlatched position within the release recess 55, the bolt 34 rotation is reversed. In this example the bolt would be rotated counterclockwise as indicated by the arrow 83 on its right hand threading (FIG. 16). During unthreading the radially projecting sidewall 57 of the clearance notch 55 or release recess which is annularly aligned with the keeper interferes with one edge of the keeper 41 which is nested within the clearance notch (FIG. 16). The sidewall 57 of the release recess 55 exerts a force on the keeper which is anchored to the collar 32 by the mounting pin 49 to drive such keeper counterclockwise against the sidewall. 85 of the transfer slot 48 to drive the collar 32 in a counterclockwise direction (FIG. 16). In effect, the bolt and collar are coupled and move as a single unit such that the collar is rotated relative to the barrel and not to the bolt. As the unthreading of the bolt and collar approaches the configuration illustrated in FIG. 4, the shoulder 40 begins to move away from the seat 45 and the trip leg 76 to allow the torsion spring 69, which outwardly biases the keeper, to force the keeper outward away from the clearance notch and back into the keeper slot 61 to the latched position forming a positive lock between the collar and barrel. Once again, the collar and barrel are effectively coupled and the bolt is free to rotate relative to the collar. Continued reverse rotation frees the bolt from the collar. The bolt may then be withdrawn from the collar and barrel assembly.

The cap 77 may provide additional assistance in driving the keeper 41 into the latched position. Referring now to FIG. 6, the keeper is shown against the interior diameter of the barrel 36 and the ramp flange 72 is approaching the cam 84 and keeper slot 61. Rotation of the bolt and collar coupling further in the counterclockwise direction, as viewed from FIG. 6, will cause the angular cam surface 92 to act as a wedge on the radial underside 95 of the ramp flange and assists in forcing the keeper out of the clearance notch in a radial direction back into the latched position as depicted in FIGS. 2 and 8.

In operation, it will be appreciated that the barrel housing 36 may be mounted in one housing or strap member and the bolt 34 inserted through a second housing or strap member for movement relative to the first member. Typically, the components will be preassembled or, at least in the case of the collar 32, barrel 36 and actuator 38 will be assembled and ready for receipt of the bolt. Then, as the bolt 34 is screwed into the collar 32, it will be appreciated that the torsion spring 69 will normally maintain the actuator 38 rotated counterclockwise to its latching position latching such collar to the barrel 36, as shown in FIGS. 1, 2 and 8. With the actuator so positioned, the side walls 79 of the latching notch or keeper slot 61 will serve to block the actuator 38 from orbiting about the central axis of the collar 32 so as to maintain such collar locked in position relative to the barrel 36 (FIG. 14). As the bolt 34 is screwed into the collar, the coarse threads 42 will afford a high rate of axial advancement from torsion applied to such bolt. As the bolt 34 advances to the right within the collar 32 from the position shown in FIG. 2 to the position shown in FIG. 3, the clearance recesses 56 will be brought into radial alignment under the keeper 41, as viewed in FIGS. 3 and 14. Then, as the actuating shoulder 40 contacts the follower leg 76 and advancement of the bolt 34 is continued, such shoulder will drive such leg 76 to the right thus rotating the actuator 38 counterclockwise about the pivot pin 49 thereby driving the keeper 41 radially inwardly to the position shown in FIG. 4 thus clearing the interior wall of the barrel 36 thereby freeing the collar 32 for rotation relative to such barrel 36 (FIG. 15). Concurrently, the elbow 68 will be driven radially into one of the recesses 55 in confronting relationship with the radially projecting axial nesting wall 56 as the bolt shoulder fully seats against the face of the collar seat 46. Continued rotation of the bolt in a counterclockwise direction as viewed in FIG. 1 will cause the fully seated bolt shoulder 40 to positively rotate the collar 32 with such bolt relative to the barrel 36 as indicated by the arrow 81 in FIG. 15. This will result in a shifting and the speed of axial travel to the speed dictated by the lead of the fine external threads 44 of the collar as engaged with the internal threads 58 of the barrel 36. Thus, enhanced mechanical advantage will be applied to the bolt resulting in greater multiplication of forces stemming from the torque applied to such bolt.

From the foregoing, it should be noted that such fastener apparatus incorporates only six basic parts for operation facilitating both the manufacturing process and minimizing weight and cost concerns and is particularly advantageous when fastening components that may initially be separated by a significant distance of more than several inches due to the incorporation of the fast lead threads. Advantageously, the second rate of speed arising from travel over the fine lead threads will possess a greater mechanical advantage as the components are drawn closer together and the loads increase.

Referring to FIGS. 10 through 13, a second embodiment of the multiple pitch fastener apparatus, generally designated 230, is similar to that shown in FIGS. 1 through 9 and is formed by coaxial threaded elements screwed together and shiftable from one speed to another upon a predetermined amount of advancement thereof by a bolt, generally designated 234. The bolt is transitioned longitudinally relative to a mounting sleeve 236 by means of an intermediate collar 232 shiftable from screwable advancement relative to such collar 232 to advancement relative to the barrel 236 by means of an actuator, generally designated 238. The bolt 234 is configured with radially, outwardly opening, dished out, nesting recesses 255 having axially projecting nesting walls 256 and is stepped down along its shank to form an annular actuating shoulder 240 for engaging the actuator to cause the shift.

Figure 10:
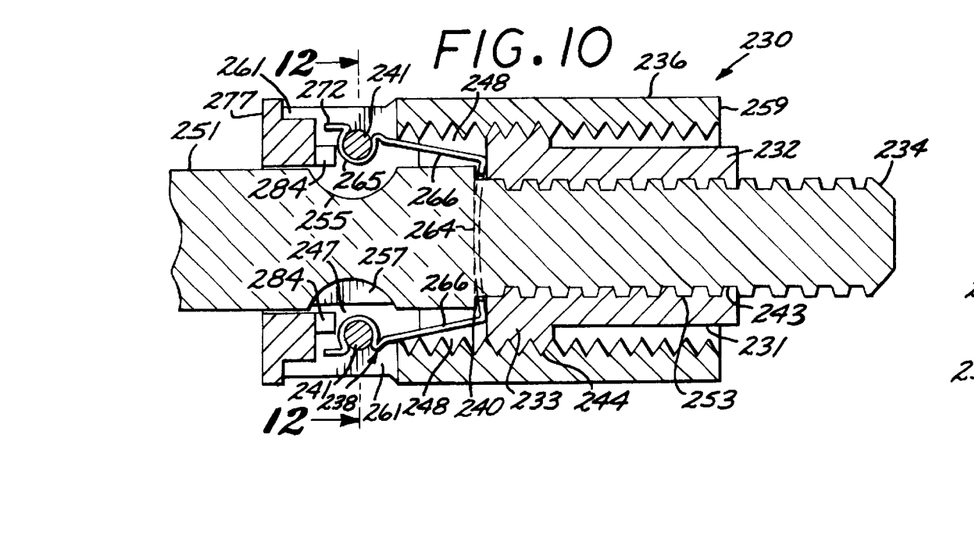
FIG. 10 is a partial sectional view of a second embodiment of the multiple pitch threaded fastener apparatus of the present invention.
Figure 11:
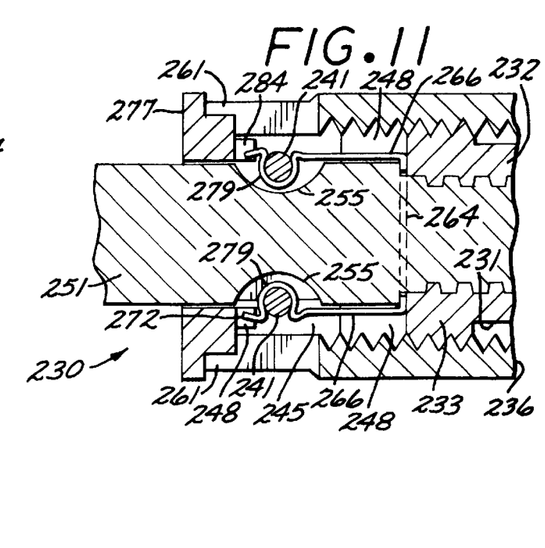
FIG. 11 is a partial sectional view of the apparatus shown in FIG. 10 illustrating the actuator in a retracted state.
Figure 24:
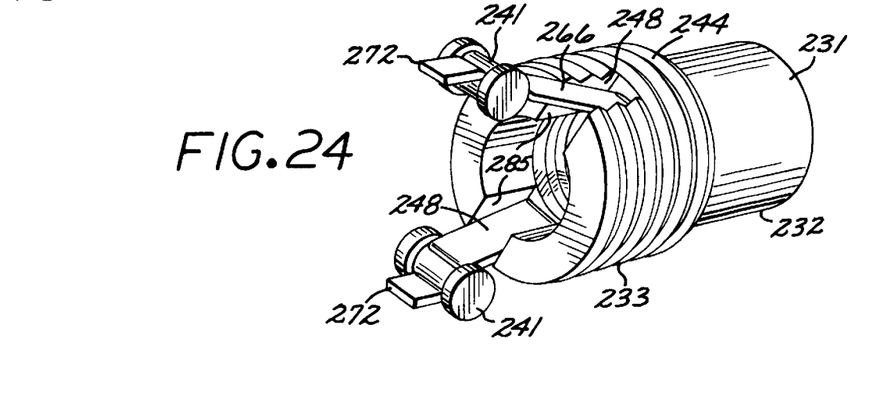
FIG. 24 is a perspective view, in enlarged scale, of the collar member and actuator illustrated in FIG. 10.

With continued reference to FIGS. 10–11 and 24, the cylindrically shaped collar member 232 is formed with fast lead interior threads 242 circumscribing a through bore 243 dimensioned to receive a portion of the bolt 234. Such collar member is in the form of a tubular nipple 231 enlarged at one end to form an external annular ring 233 formed with fine external threads 244. The proximal end of such collar includes an open ended chamber 245 having a seat 246 at its distal end formed with a central opening leading to the through bore 243. The seat projects radially from the central opening and forms a flat, ring-shaped surface providing a longitudinal stop for the bolt shoulder 240. Projecting toward the left extremity of the apparatus 230 as viewed from FIG. 10, from the outside diameter of the seat, is a chamber sleeve 247 which is cylindrically shaped and formed with a diameter larger than the through bore 243. A pair of diametrically opposed longitudinally projecting transfer slots 248, each defined by spaced apart, opposing sidewalls 280 provide a passageway from the interior of the chamber to the exterior (FIG. 24). Such slots project from the seat to the proximal end of the sleeve and allow movement of the keeper 241 between a radially extended state and a retracted state.

Referring now to FIGS. 10 and 11, construction of the bolt member is the same as discussed in the first embodiment. The bolt generally includes an elongated bolt shank 251 projecting longitudinally from a bolt head (not shown). The bolt head is constructed to accommodate a variety of turning tools and may be any bolt head illustrated or described herein as well as any well known shape suitable for the desired task. Fast lead threads 253 wrap around the circumference of the distal or right end portion of the shank. A gap 254 is disposed between the proximal ends of the threads and the enlarged in diameter actuating shoulder 240. Between the shoulder and the head of the bolt is a group of four semi-elliptically shaped clearance notches 255 recessed inwardly from the outer diameter of the bolt shank. Each notch includes a pair of keeper stops in the form of a bowl-shaped threading stop 256 and an unthreading stop 257 in the form of a radially projecting sidewall extending at a right angle from the bowl. The respective stops act on the adjacent side of the keeper to drive the keeper in the same direction as the rotation of the bolt.

Providing a surface for attachment to one of the components to be fastened is the barrel 236 which includes a cylindrically shaped interior passageway defined by a fine lead interior threads 258 dimensioned to mesh and rotationally receive the exterior fine lead threads 244 of the collar 232. A distal open end 259 is opposed by a proximal end 260 with an opening of larger diameter than the enlarged portion of the shank 251. A pair of diametrically opposed keeper slots 261 project longitudinally from the proximal end of the barrel. The blind ends 262 of the slots are perpendicular to the central axis of the barrel.

While the apparatus 230 is designed to initially take advantage of the relatively large or coarse pitch of the fast lead threads for faster travel of the bolt through the collar when loads are relatively low, by shifting the keeper 241 from an extended state to a retracted state, greater mechanical advantage may be achieved as the components are drawn in close proximity and the load is increased (FIGS. 10–11). The actuator 238, when triggered by the actuating shoulder 240 of the bolt 234, provides this shifting function that transitions the coupling of the collar and barrel to the collar and bolt. A pair of diametrically opposed keepers 241 connected to a follower 264 by a pair of elongated spring arms 266 or lever arms defines the actuator. Each individual keeper is comprised of a C-shaped keeper clamp 279 retaining a friction lock 281. When viewed in axial cross section, the friction locks are substantially dumbbell shaped with a narrow central groove for frictional receipt of the respective clamps and thus be held in a position oriented with respective cylindrical axes projecting tangential to the path of rotation for the barrel 236. Both keeper clamps extend axially toward the left to form respective ramp flares 272. The spring arms 266 connect each clamp with opposite sides of the follower 264 which is in the form of a relatively thin flexible wave washer or curved ring. The inner diameter of the follower is such that the threaded portion of the bolt shank will pass through but the enlarged portion of the shank including the actuator shoulder 240 will not pass through the inner diameter of the ring. The washer, in the unflexed position as illustrated in FIG. 10, is formed with a small bow that bellies outwardly to form gap between the seat 246 and the central portion of the washer when the actuating shoulder of the bolt is not abutting the washer. In this position, the spring arms 266 project axially to the left and radially outwardly to dispose the respective keepers 241 in between the opposing sidewalls 285 of the respective keeper slots 261. The gap, when viewed in longitudinal cross section is greatest near the axial center line of the washer and decreases to zero at the radial extremities. Alternatively the washer may have faceted transitions instead of a smooth curvature as long as the function of the actuator described below is achievable. It will be appreciated that there is no need to anchor this actuator to the collar member and the discrete actuator may merely be inserted prior to use. Such actuator may be desirable for its ease in assembly and replacement. To minimize frictional resistance between the spring arms and keepers and the walls of the transfer slots in the collar during radially outward and inward movement of the keepers, the width of the two opposing spring arms should be wider at the base near the wave washer than the width near the keepers so that contact with the walls of the transfer slots is made initially by the spring arms as opposed to the sides of the respective keepers.

Figure 12:
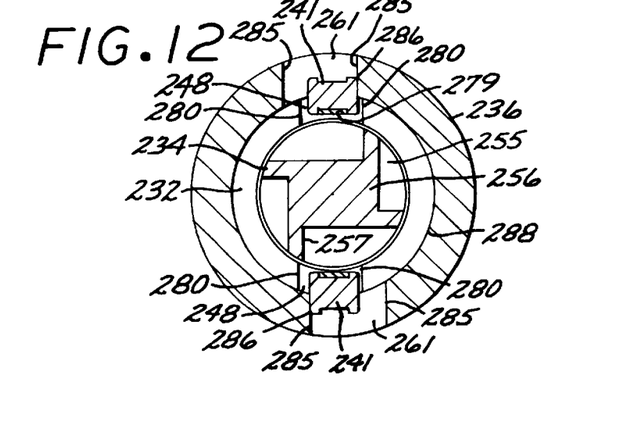
FIG. 12 is an axial sectional view, in enlarged scale, depicting the actuator of the second embodiment in a latched position.

In operation, the fastener apparatus 230 is first assembled by threading the fine lead threads 244 of the collar 232 into the complementary fine lead threads 258 of the barrel 236. The actuator 238 is then inserted into the sleeve 247 such that the wave spring 264 is positioned adjacent to the seat 246 and the keeper 241 and part of the spring arms 266 are placed through the transfer slots 248. In this position, most of the actuator is nested within such sleeve. As illustrated in FIGS. 10, 12 and 24, in this position, rotation of the collar is inhibited when the actuator is prevented from rotating with the collar due to the interference between the side walls 280 of the transfer slots 248 and the respective spring arms 266. The outermost portion of each keeper is placed with the keeper slots 261 of the barrel. The bolt 234 is then inserted into the through bore 243 and rotated in a clockwise direction as viewed in FIG. 12 to mesh the fast lead threads 253 of the bolt with internal fast lead threads 242 of the collar. At this point in the assembly, the actuator is in the initial or latched position as shown in FIGS. 10 and 12. In other words, the wave spring 264 is positioned against the seat 246 of the collar 232 within the sleeve 247 and encircles the threaded portion 253 of the bolt 234. A small gap is present between the central belly portion of the wave spring and the seat. The spring arms 266 project radially outwardly and toward the proximal end of the sleeve disposing at least a portion of the respective keepers 241 within the respective keeper slots 261. The distal edge 262 of the slots may rest against the spring arms. Due to the interference of the keeper with the sidewalls 285 of the keeper slots of the barrel forming a positive lock, the actuator and collar are prevented from rotating relative to the barrel (FIG. 12). The bolt however is free to turn relative to the collar on its fast lead threads because the keepers are positioned radially outwardly of the nesting recesses and thus do not interfere with the rotation of the bolt.

Figure 13:
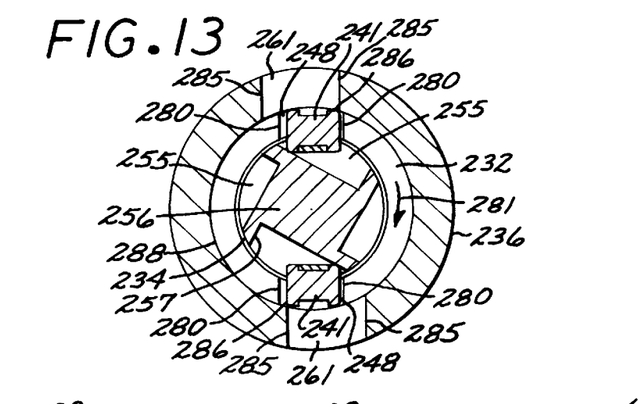
FIG. 13 is an axial sectional view similar to FIG. 12, depicting the actuator in a retracted position.

Continued rotation of the bolt 234 in the clockwise results in further travel of the actuator shoulder 240 and clearance notches 255 in the longitudinal direction further into the collar and radially aligns the clearance notches radially interiorly of the respective keepers 241. As the bolt shoulder 240 drives the wave spring 264 flat against the seat 246, the spring arms will retract or pivot radially inwardly about the right hand extent of their respective spring arms 266 toward the bolt shank to dispose the keepers 264 into the radially aligned release recesses 255 to assume the unlatched position shown in FIGS. 11 and 13. This retracted or unlatched position frees the collar 232 from the barrel 236 and instead couples the bolt 234 to the collar. In this instance, longitudinal travel of the bolt shoulder has resulted in the shoulder abuttingly engaging the wave spring and reducing the gap between the wave spring and the seat 246. When fully seated, the actuating shoulder 240 sandwiches the wave spring flat against the seat (FIG. 11). The resulting flattening drives the spring arms 266 and connected keepers 241 inwardly to settle into the clearance notches 255 of the bolt such that the sidewalls 285 of the keeper slots 261 no longer interfere with rotation of the keepers relative to the barrel and the collar is free to rotate relative to the barrel. The keepers however, do abut the bowl shaped keeper stops 256 in the respective clearance slot and are annularly aligned with the radially projecting sidewalls 257 which interferes with rotation of the bolt relative to the collar (FIG. 13). As a result, the bolt and collar turn as a unit on the fine lead threads relative to the barrel. Continued rotation of the bolt and collar to advance the bolt and collar longitudinally relative to the barrel will effectively fasten the components attached to the barrel and the bolt. Turning of the collar relative to the barrel will orbit the leading edge 286 of the keeper causing it to slide along the inner diameter 288 of the fine lead threads in the clockwise direction as indicated by the directional arrow 281 in FIG. 13. As will be appreciated by those skilled in the art, the leading edges of such keeper will be on the opposite side of the respective keepers when the rotation is counterclockwise. It will be appreciated that similar treatment to the leading edge as described above may be performed to provide additional or reduced frictional resistance between the keeper and the interior fine threads of the barrel as desired.

During unthreading, the bolt 234 will be generally positioned as shown in FIG. 11 and, assuming right hand threads, will be rotated in the counterclockwise direction. The keeper 241 will remain in the latched position allowing the bolt and collar 232 to turn as a unit relative to the barrel 236. Upon reaching the point shown in FIG. 11, additional unthreading results in the actuating shoulder 240 moving longitudinally away from the wave spring 264 which is normally biased in the curved state away from the seat 246. As a gap is reintroduced between the wave spring and seat, the resilient spring arms 266 will rotate to shift the distal ends thereof radially inwardly to shift the keepers back into the latching position as illustrated in FIG. 10. A cap 277 similar to the one described above may be incorporated with the exception that two cap ramps 284 are incorporated to interact with the respective ramp flares 272 and assist driving the keeper back into the latched position.

Figures 17, 18:
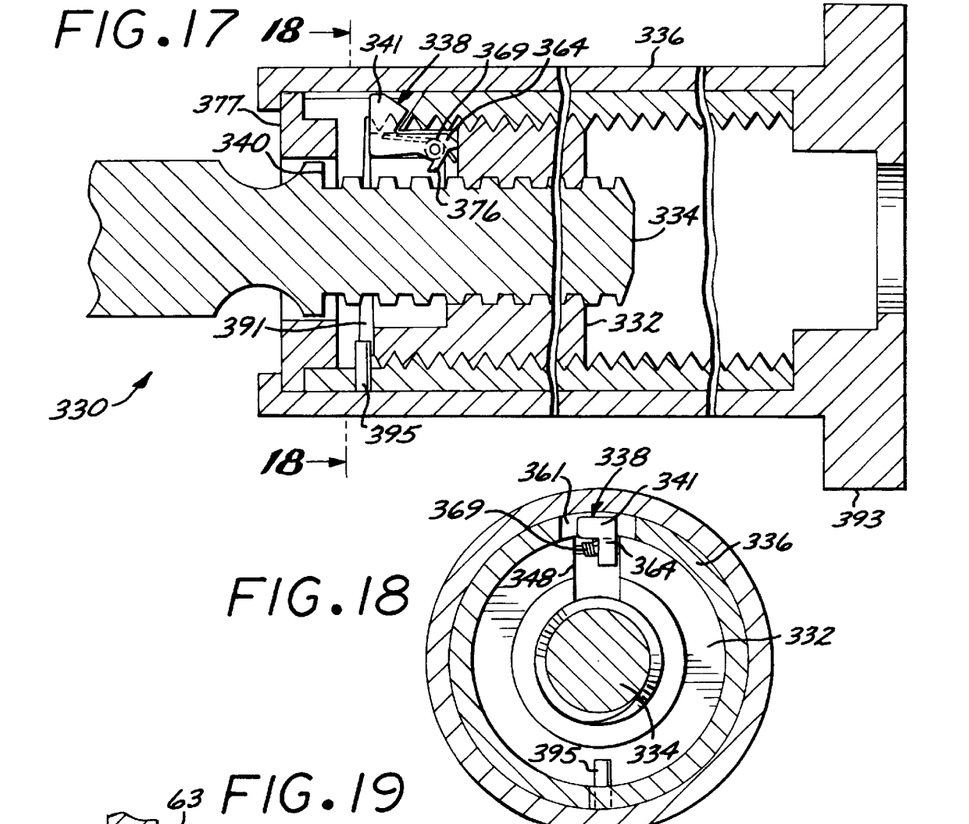
FIG. 17 is a broken sectional view of a third embodiment multiple pitch threaded fastener apparatus of the present invention.
FIG. 18 is a sectional view taken along the line 18—18 shown in FIG. 17.

Another means may be used to assist the keeper into the latching position during unthreading. In this embodiment, as illustrated in FIG. 17, the fastener apparatus, generally designated 330, includes a collar 332, a bolt 334 with an actuating shoulder 340, a barrel 336, and an actuator 338 having a keeper 341 and a follower 364. Like the first two embodiments, the actuating shoulder triggers motion by the actuator to shift the keeper between a latched position and an unlatched position.

The annular collar member 332 is constructed similarly to the collar 32 of the first embodiment. The proximal end of the collar member 332 differs however, in that the circumference of the open proximal end of the collar includes a threaded surface with an inclined stop surface 391. The bolt 334 is identical to the bolt 34 described above in the first embodiment. Additionally a stop pin 395 press fit into the inner wall of the barrel projects radially inwardly from the inner diameter of the barrel wall. The stop pin is positioned longitudinally along the barrel to coincide with the position of the collar with the keeper in its latched position. The actuator 338 differs from the first embodiment only in that the ramp flange is omitted from the keeper 341. The cap 377, if used, does not include a cap ramp and instead, the cylindrical section of the cap terminates in a planar surface perpendicular to the central axis of the central bore of the collar member 332.

In use, this fastener apparatus 330, is threaded in the previously disclosed manner with the bolt turning on fast lead threads within the collar relative to the coupled collar and barrel unit. As the actuating shoulder 340 of bolt engages the trip leg 376 of the actuator, the keeper is swung inwardly into the clearance notch of the bolt such that the bolt and collar turn as one unit relative to the barrel on fine lead threads. This operation is similar to that described above for the first embodiment. The difference in operation occurs upon unthreading of the bolt from the collar and barrel. At the point, just past where the actuating shoulder 340 is just about to release pressure on the trip leg 376 of the actuator 338, the inclined stop surface 391 contacts the stop pin 395 providing a momentary stoppage of rotation of the collar member. This positive stop is felt by the operator who releases excessive torque on the bolt and thus allows the torsion spring 369 to exert all of its force in the radial outward direction to drive the keeper back into the latched position. Consequently, less spring force is required to shift the keeper from an unlatched state to a latched state during removal of the bolt. The collar is then coupled to the barrel and the operator may then entirely unthread and remove the bolt from the assembly.

Figure 19:
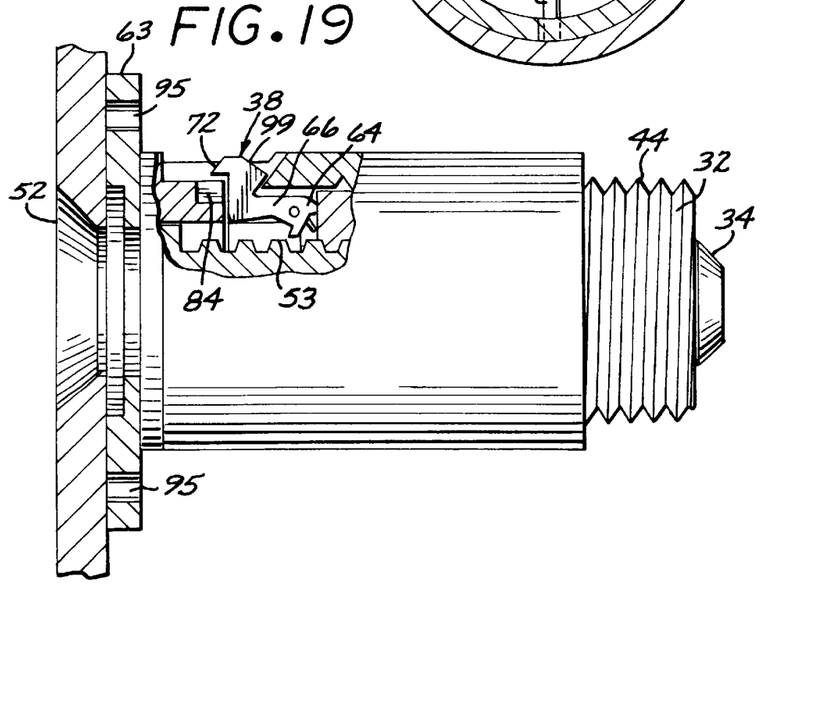
FIG. 19 is a partial sectional view of a fourth embodiment of the fastener apparatus of the present invention.

While the above description illustrates the threading and unthreading of the bolt from rest of the assembly, this fastener apparatus may be used in conjunction with a variety of structures to draw two components closer together. Typically the barrel is secured by welding or other suitable methods to one of the components and the other component is positioned to be sandwiched between one end of the bolt head and the barrel. FIG. 19 illustrates the incorporation of an attachment flange 63 as an extension of the proximal end of the barrel or alternatively extending from the cap. The attachment flange includes a pair of fastener bores 95 to fasten the barrel in a suitable manner to one component of a structure. The second component would be placed over the mounting flange and its through bore aligned with the bore in the attachment flange. The bolt would then be inserted into both bores and threading accomplished in a manner described above. The bolt head is larger in diameter than the through bore and may be countersunk if desired. As illustrated in FIG. 17, the attachment flange 393 could be located on the distal end of the barrel.

The components of the fasteners 30, 230, or 330 are preferably constructed of rigid metallic materials although other materials may be used if suitable for withstanding the fastening loads. The fasteners may be constructed with differing lengths to accommodate a variety of applications such as a stubby fastener illustrated in FIG. 19 for use a stress panel fastener which is typically no longer than two inches. The two components to be fastened are arranged in layers with the barrel on one side and the bolt with enlarged bolt head inserted through the opposite side. Both components are thus sandwiched between the barrel and bolt head. It may be desirable in certain situations to preload the fastener apparatus by overtorquing the bolt thus inducing a compressive force into the structure to avoid fatigue failure as is a common concern in aircraft components. Because the width of the keeper is smaller than the width of the release recess, the bolt may turn slightly relative to the collar. The impact of this effect, known as backlash or unthreading of the bolt, is restricted by the keeper contacting the bowl stop in the release recess. However, even a minute amount of backlash may be undesirable especially if a preloading condition is to be established. In order to overcome this problem, I have introduced two design factors that overcome the backlash effect entirely and allow the fastener apparatus to remain in a preloaded state. First, the frictional resistance of the fast lead thread to tension threading, at or near the desired preload, must be greater than that for the fine lead thread, and a secondary application of tightening torque is necessary. The fine lead thread will tend to turn prior to the fast lead bolt thread and thus the bolt will not rotate clockwise as viewed in FIGS. 1 and 15–16 within the collar as the collar threads into the barrel to reinstate the desired preload and the bolt is locked against further counterclockwise rotation out of the collar.

Figure 20:
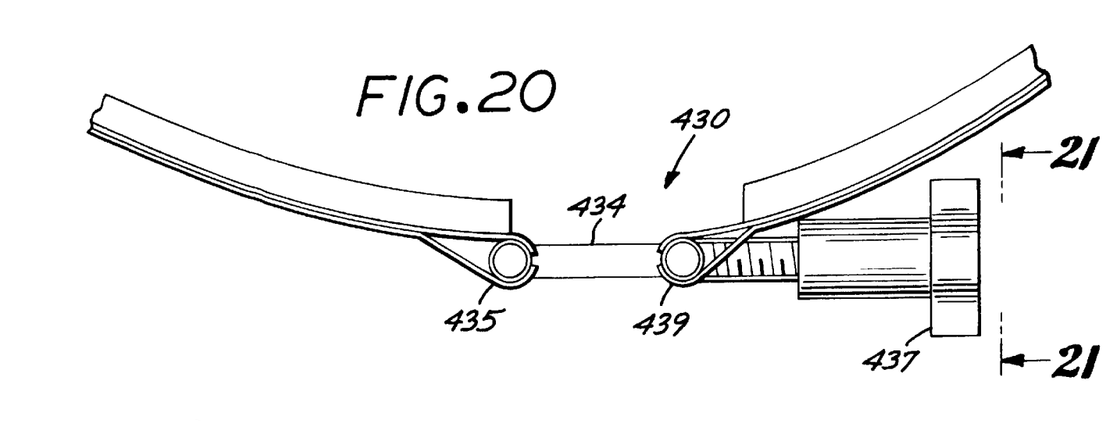
FIG. 20 is a side view of a fifth embodiment of the fastener apparatus of the present invention.
Figure 21:
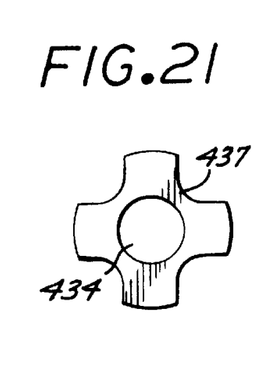
FIG. 21 is an end view taken along the line 21—21 shown in FIG. 20.

Alternative implementations of the fastener 430 such as incorporation into a V-band coupler (FIG. 20) or turnbuckle assembly 530 (FIGS. 22–23) are easily integrated with the fastener apparatus described herein. In particular, the V-band coupler 430 has a bolt section 434 connected to one end of the V-band 435. The barrel is modified with a handle portion 437 at one end and connected to the other part of the V-band 439. As the handle is turned, the barrel collar assembly is threaded over a portion of the bolt drawing the bolt through the collar. Initially, the rotation is upon the fast lead threads which closes the gap between the components rapidly. Continued rotation results in the transfer of the keeper from latched position to the unlatched position and the rotation turns through the fine lead threads as the components become adjacent fastening the two components together. It will be appreciated that a conventional V-band coupling using 10–32 thread requires 40 turns of the bolt to draw a ten inch coupling through 1.25 inches whereas the fastener apparatus of the present invention may draw the same V-band coupling through the same distance in only eight turns.

Figure 22:
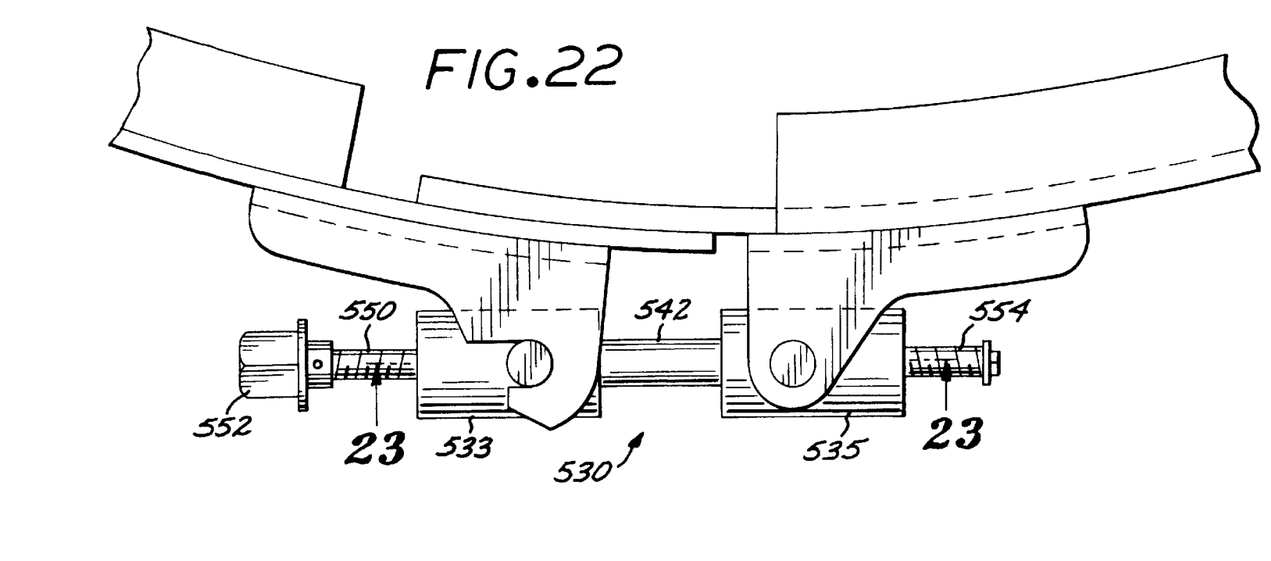
FIG. 22 is a side view of a sixth embodiment of fastener apparatus of the present invention.
Figure 23:
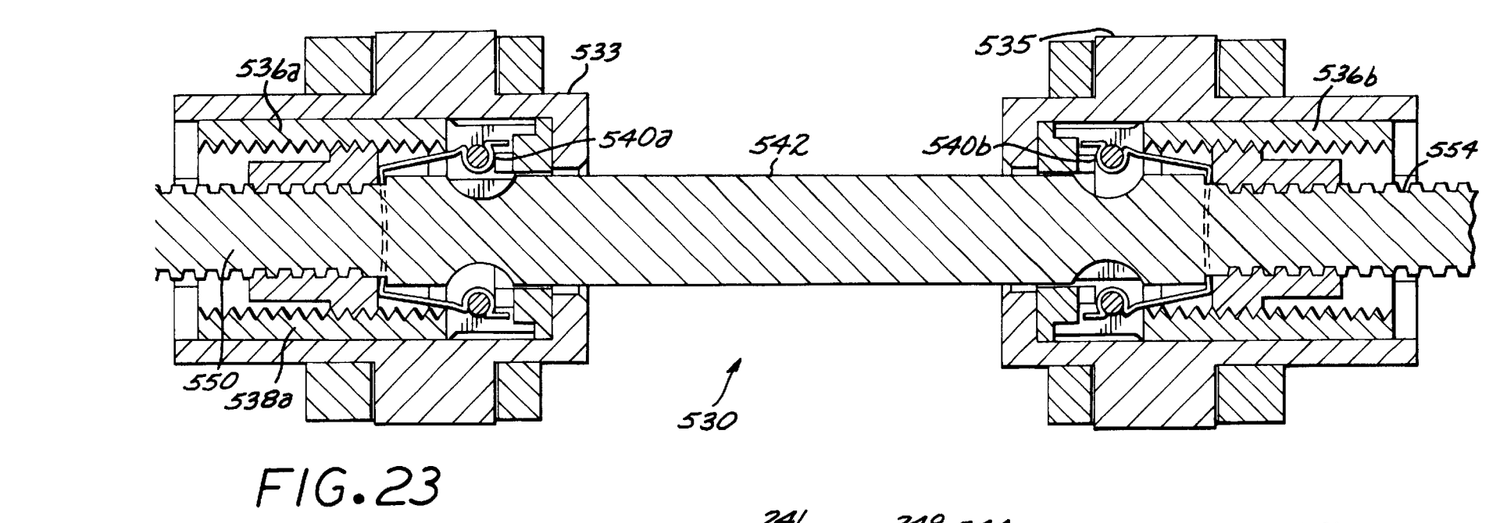
FIG. 23 is an broken sectional view, in enlarged scale, of the embodiment shown in FIG. 22.

Referring now to FIGS. 22–23, the turnbuckle assembly 530 shows the versatility of the fastener apparatus 30 as a first receiver subassembly 533 including the barrel 536a, collar 538a, and actuator 540a and a second receiver subassembly 535 including similar components 536b, 538b, and 540b are connected by a single bolt 542 with two separate threading sections for each respective subassembly. For example, the first threading section 550 includes left hand threads and the second threaded section 554 includes right hands threads. As the bolt is rotated in a clockwise direction, the first receiver which includes a collar 538a with left hand threads is forced away from the bolt head 552 while the second receiver which includes a collar 538b with right hand threads is drawn closer to the bolt head and the first receiver. The first receiver barrel is anchored to one portion of the structure to be fastened or to a conventional band for securing structure such as an engine cowling and the second receiver is attached to the other portion of the structure or band. As the respective receivers are drawn closer together, the structure or band will be effectively fastened and prevented from expanding. Such turnbuckle assembly may draw up to 3 inches in only 6 turns and weigh only about two pounds versus about nine pounds of conventional jet engine couplings. The fastener apparatus of the present invention is also less expensive than conventional fasteners used for similar purposes in the field of aircraft manufacture.

Figure 25:
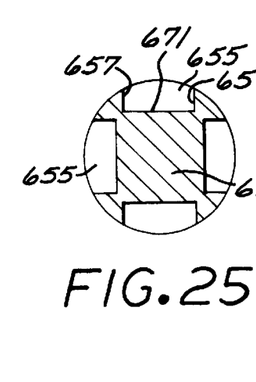
FIG. 25 is a view similar to that shown in FIG. 7 depicting an alternative bolt shaft.

In some instances, a modified clearance recess may be used. As illustrated in FIG. 25, a bolt 634 is formed with channel shaped clearance notches 655 having a pair of radially projecting stops including a threading stop 657 and an unthreading stop 659 interposed by a flat land 671. When one of the keepers described herein is positioned within the clearance recess 655, and the bolt is subsequently turned clockwise, the threading stop will abut the edge of the keeper and assist in driving the anchored collar in the game rotational direction. Upon unthreading, the keeper will abut the unthreading stop and perform similarly to the sidewall 57 described hereinabove.

In each of the embodiments, it will be appreciated that a variety of thread shapes may be used. For example, the threads may "V" shaped, square, acme, buttress, or any other suitable thread shapes as are commonly used in the industry. Additionally, the fast lead threads and fine lead threads may be of different thread shape configurations. It is preferable to use the "V" shaped threads for the fine leads in order to increase the frictional forces and facilitate the frictional locking feature. The thread directions may be either right handed or left handed but in each case the thread direction of the external threads of the bolt and the external threads of the collar run in the same direction. It is also important to note that different frictional qualities may be developed by varying the relative pitch angles between the fast lead and fine lead threads. If desired, multiple cap ramps, multiple keepers, single or multiple clearance notches may be selected for incorporation into the design without detracting from the spirit and scope of the invention.

It must be appreciated that the head of the bolt is constructed for accommodating a turning tool including the operator's hands, manual wrenches or screwdrivers, and speed wrenches or other air driven tools. Different head shapes may be incorporated without departing from the spirit and scope of the invention as the head shape is not critical to the present invention. FIG. 17 illustrates yet another alternative wherein the head may be shaped as a common bolt head having a number of faceted sides. This type of head readily accepts a conventional ratchet wrench. The shape of the head is not critical and a variety of suitable head shapes could be used by one of ordinary skill in the art without departing from the scope of the invention.

While several forms of the present invention have been illustrated and described, it will also be apparent that various modifications may be made without departing from the spirit and scope of the invention.

What is claimed is:

1. Multiple pitch threaded fastener apparatus comprising:
   a collar member configured with a bore formed with internal collar threads of a first pitch, said first pitch being different from said second pitch and external threads of a second pitch;
   a bolt member formed with external threads meshed with said internal threads and including a shank configured with an actuating surface movable longitudinally along a predetermined path as said bolt is rotated relative to said collar, said bolt further including at least one release recess disposed along said actuating surface;
   a barrel formed with interior threads meshing with said external collar threads further including at least one latch slot;
   an actuating shoulder on one of said members and facing longitudinally in one direction for travel along a predetermined path as said bolt is rotated relative to said collar to advance thereinto;
   an actuator interposed between said bolt and barrel members, mounted on the other of said members and a keeper shiftable from a latching position engaging said latch slot inhibiting said collar from rotating relative to said barrel to an unlatching position disengaging said keeper from said slot to free said collar with said bolt for rotating relative to said barrel, said actuator further including a follower disposed in said predetermined path and engageable by said shoulder upon said bolt being rotated a selected distance into said collar to shift said keeper from said latching position to said unlatching position.

2. Fastener apparatus as set forth in claim 1 wherein:
said bolt is configured with said shoulder; and
said actuator is carried from said collar.

3. Fastener apparatus as set forth in claim 1 wherein:
said actuator includes a spring biasing said keeper to said latching position.

4. Fastener apparatus as set forth in claim 1 wherein:
said bolt includes at least one release recess aligned with said keeper for receiving said keeper as it is shifted to said unlatched position.

5. Fastener apparatus as set forth in claim 4 wherein:
said follower is formed with a trip leg to engage said actuating shoulder and rotate said keeper radially inwardly to abut said bolt member within said release recess.

6. A fastener apparatus as set forth in claim 4 wherein:
said release recess is semi-elliptical in shape and includes a radially projecting sidewall at one end for abuttingly engaging said actuator.

7. Fastener apparatus as set forth in claim 1 wherein:
said actuator includes a formed spring captivated in said collar member and including a central aperture dimensioned to receive a portion of said bolt shank.

8. Fastener apparatus as set forth in claim 7 wherein:
said actuator includes a wave spring.

9. Fastener apparatus as set forth in claim 7 wherein:
said actuator includes a longitudinally and radially outwardly projecting spring arm carrying on its free extremity said keeper.

10. Fastener apparatus as set forth in claim 9 wherein:
said actuating shoulder is constructed to compress said spring to drive said outwardly extending spring arm inwardly to move said keeper from a latched position to an unlatched position.

11. Fastener apparatus as set forth in claim 7 wherein:
said actuator includes a pair of diametrically opposed leaf spring arms projecting longitudinally and radially outwardly from said spring and carrying said keeper on their respective free extremities.

12. Fastener apparatus as set forth in claim 1 wherein:
said first pitch is greater than said second pitch.

13. Fastener apparatus as set forth in claim 1 wherein:
said second pitch is 1/6 of said first pitch.

14. Fastener apparatus as set forth in claim 1 further including:

a cap covering an open end of said barrel and formed with a central clearance bore for receipt of said bolt member, said cap further including at least one ramp projecting laterally and radially outwardly to, upon radial alignment of said latch slot of said barrel with said actuator during unthreading of said bolt, engage said actuator to drive said keeper radially outwardly from said unlatching position to said latching position.

15. Fastener apparatus as set forth in claim 1 further including:

a pin projecting radially inwardly from said barrel to engage said collar member and inhibit further rotational movement of said collar member upon radial alignment of said keeper with said latch slot such that said keeper may move radially outwardly from said unlatching position to said latching position.

16. Fastener apparatus as set forth in claim 1 wherein:

said barrel is formed with an attachment flange at one end.

17. Fastener apparatus as set forth in claim 1 further including:

a pivot pin mounted within said collar member;

a torsion spring mounted on said pin and wherein;

said actuator is rotatably coupled with said pin and said spring is configured to bias said actuator radially outwardly.

18. Fastener apparatus as set forth in claim 1 wherein:

said bolt member includes said actuating shoulder;

said collar includes a seating surface receiving said actuating shoulder stopping further relative rotation between said collar and said bolt and to, upon subsequent rotation of said bolt in a threading direction cause said collar to concurrently rotate in the same direction as said bolt.

19. Fastener apparatus as set forth in claim 1 wherein:

said release recess includes a radially projecting sidewall; and an edge of said keeper abuttingly engages said sidewall upon reverse rotation of said bolt relative to said collar with said keeper in said unlatched position, whereby subsequent unthreading of said bolt member concurrently rotates said collar member relative to said barrel.

20. Fastener apparatus as set forth in claim 1 wherein:

said barrel includes at least one slot for receipt of said keeper in said latched position.

21. Fastener apparatus as set forth in claim 1 wherein:

said bolt member is formed with a hexagonally shaped head.

22. Fastener apparatus as set forth in claim 1 wherein:

said respective external threads of said bolt member and said collar are formed with the same thread direction.

23. Fastener apparatus as set forth in claim 1 wherein:

said bolt includes a plurality of release recesses to be selectively radially aligned with said actuator for nesting receipt of said keeper in an unlatched position.

24. A fastener apparatus as set forth in claim 1 wherein:

said bolt member is formed with a quad lead thread.

25. A fastener apparatus as set forth in claim 1 wherein:

said barrel and said collar member include respective first and second sections spaced a predetermined distance apart, said first section of said collar member is formed with an internal coarse thread direction in the same direction as said external coarse threads of said bolt and said second section of said collar member is formed with internal coarse threads having an opposite thread direction, such that both sections are constructed to, upon relative rotation of said bolt, reduce said predetermined distance.

26. Fastener apparatus as set forth in claim 1 wherein:

said release recess includes at least one stop; and an edge of said keeper abuttingly engages said stop upon rotation of said bolt in at least one rotational direction relative to said collar with said keeper is in said unlatched position, whereby subsequent threading of said bolt member concurrently turns said collar member relative to said barrel in said rotational direction.

27. Fastener apparatus as set forth in claim 1 wherein:

said release recess includes first and second opposing stop walls extending radially inwardly from the outer radial extent of said bolt shank and projecting longitudinally along said actuating surface at both ends of said recess; and said keeper abuttingly engages said first stop wall as said keeper is rotated in a first direction toward said first stop wall when said keeper is in said unlatched position and upon continued rotation of said bolt member in said first direction said collar member rotates relative to said barrel in said first direction and, upon rotation of said bolt member in a reverse direction, said keeper abuttingly engages said second stop wall to, upon continued rotation of said bolt member in said reverse direction, concurrently turn said collar member in said reverse direction relative to said barrel.

28. Fastener apparatus as set forth in claim 1 wherein:

said barrel is attached to a free end of a V-band coupling.

29. Fastener apparatus as set forth in claim 1 wherein:

the inclination of said external threads of said bolt member, relative to an axial plane, is less than the inclination of said barrel internal threads to, upon application of loads thereto, cause said barrel internal threads to have less frictional resistance to threading than said bolt member external threads threading into said collar.

30. Fastener apparatus as set forth in claim 1 wherein:

said keeper, when fully engaged in said unlatched position in said release recess and with said collar fully threaded into said barrel, is radially outwardly biased to maintain frictional contact with a minor diameter of said internal threads of said barrel upon unthreading of said bolt thereby providing a frictional lock resisting unthreading of said collar member from said barrel member.

31. A fastener apparatus as set forth in claim 1 wherein:

said keeper includes a leading edge slidingly engageable with said interior threads of said barrel as said collar member is rotated relative to said barrel and said keeper is in said unlatched position.

32. Fastener apparatus as set forth in claim 31 wherein:

said interior threads are longitudinally scored to increase the frictional resistance between said leading edge of said keeper and said barrel.

33. Fastener apparatus as set forth in claim 31 wherein:

said leading edge is constructed to reduce friction between said keeper and said barrel.

34. Fastener apparatus of claim 1 wherein:

said actuator includes a dog formed on one extremity with said keeper and on the opposite with said follower, said dog being pivotally mounted to said collar.

35. Fastener apparatus of claim 34 that includes:

a torsion spring biasing said keeper into engagement with said latch slot.

36. Multiple pitch threaded fastener apparatus comprising:

- a bolt configured with external threads having a first pitch and an actuating shoulder facing axially in one direction, said bolt including at least one radially outwardly opening nesting slot having a radially projecting nesting wall facing in one annular direction;
- a selector collar configured with a bore formed with internal threads engaging said external threads and external collar treads having a second pitch, said first pitch being different from said second pitch;
- a barrel including internal threads engaging said external collar threads, said barrel further including a latching slot defined by a pair of spaced apart transfer walls for travel axially past said shoulder as said bolt is screwed into said collar;
- an elongated actuator captivated in said collar and including on one extremity a keeper to be positioned in said latching slot to engage one of said transfer walls to keep said collar from rotating relative to said barrel and being selectively shiftable from said latching slot to a nesting position in said nesting slot to, upon further rotation of said bolt, cause said nesting wall to engage said keeper and cause said collar to rotate with said bolt, said actuator including a follower for, upon screwing of said bolt a predetermined distance into said collar, engaging said shoulder and being operative upon further screwing of said bolt into said collar to transfer said keeper from said latching slot to said nesting slot to keep said bolt from rotating relative to said collar.

37. Fastener apparatus of claim 36 wherein:

said collar includes a radial transfer slot providing clearance for transfer of said keeper from said latch slot to said nesting slot.

38. Fastener apparatus of claim 36 wherein:

said actuator includes a spring biasing said keeper radially outwardly toward said latch slot.

39. Fastener apparatus of claim 36 wherein:

said bolt is formed with a pair of nesting slots;

said barrel is formed with a pair of latching slots alignable radially with the respective nesting slots; and said actuator includes a pair of keepers for transfer between the respective latching slots and nesting slots.

40. Fastener apparatus of claim 36 wherein:

said actuator includes a wave spring forming said follower and an axially projecting leaf spring carrying said keeper at a free end thereof.

41. A threaded fastener comprising:

- a receiver including a barrel having a cylindrical inner bore formed with a fine lead thread having a predetermined first pitch and a latching slot, a thread selector configured with an outer diameter circumscribed by a threaded portion having a pitch equal to said first pitch, said thread selector further including an inner aperture formed with a circumferential thread having a fast lead pitch greater than said first pitch, a latching element nested partially within said thread selector and configured to be radially outwardly biased in a first position with a first portion disposed within said latching slot to inhibit rotation of said thread selector relative to said barrel; and
- a bolt having a bolt head and a shank including a threaded portion with a pitch equal to said inner aperture pitch of said thread selector and dimensioned to be received within said inner aperture, said bolt further configured with a notch and a shoulder for engaging said latching element and upon further rotation of said bolt actuating said latching element to withdraw from said latching slot to nest within said notch in said bolt wherein said thread selector may then be rotated relative to said barrel.

42. Multiple pitch threaded fastener apparatus comprising:

- a cylindrical barrel configured with a bore formed with internal threads of a predetermined first pitch;
- a cylindrical transfer member in said barrel and having external screw threads engaging said internal threads and formed with an inner bore configured with internal screw threads having a predetermined second pitch;
- a bolt including external threads engaging said internal screw threads and an axially facing actuating shoulder; and
- a radially projecting shift member interposed between said transfer member and said barrel and constructed to assume a first latching position to inhibit rotation of said transfer member relative to said barrel and arranged to, upon screwing of said bolt in one direction a selected distance be engaged by said actuating shoulder to be shifted to a second unlatched position coupling said bolt with said transfer member to upon further screwing of said bolt in said one direction, rotate said transfer member with said bolt relative to said barrel.

* * * * *

UNITED STATES PATENT AND TRADEMARK OFFICE
CERTIFICATE OF CORRECTION

PATENT NO.   : 6,302,633 B1
DATED        : October 16, 2001
INVENTOR(S)  : L. Richard Poe Page 1 of 1

It is certified that error appears in the above-identified patent and that said Letters Patent is hereby corrected as shown below:

<u>Column 4,</u>
Line 6, replace "loft" with -- left --.

Signed and Sealed this

Nineteenth Day of March, 2002

Attest:

JAMES E. ROGAN
*Director of the United States Patent and Trademark Office*

*Attesting Officer*